United States Patent [19]

Nishiguchi et al.

[11] Patent Number: 4,679,398
[45] Date of Patent: Jul. 14, 1987

[54] VARIABLE CAPACITY TURBOCHARGER CONTROL DEVICE

[75] Inventors: Fumio Nishiguchi; Masato Noguchi, both of Yokohama; Keiji Hatanaka, Fujisawa, all of Japan

[73] Assignee: Nissan Motor Co., Ltd., Yokohama, Japan

[21] Appl. No.: 706,278

[22] Filed: Feb. 27, 1985

[30] Foreign Application Priority Data

Feb. 29, 1984 [JP] Japan .................................. 59-36105

[51] Int. Cl.⁴ ........................................... F02B 37/12
[52] U.S. Cl. ..................................................... 60/602
[58] Field of Search ................. 60/600, 601, 602, 603; 415/144, 145, 151

[56] References Cited

U.S. PATENT DOCUMENTS 4,177,006 12/1979 Nancarrow ........................... 60/602
4,459,808 7/1984 Rydquist et al. ..................... 60/602

FOREIGN PATENT DOCUMENTS 18522 2/1983 Japan ...................................... 60/602

Primary Examiner—Michael Koczo
Attorney, Agent, or Firm—Schwartz, Jeffery, Schwaab, Mack, Blumenthal & Evans

[57] ABSTRACT

An apparatus for controlling a turbocharger includes a compressor and a turbine coupled to the compressor and comprises a variable capacity device for varying the flow rate of an exhaust gas introduced into the turbine in the low speed state of an engine connected to the turbocharger, an exhaust gas bypass device bypassing the variable capacity device and the turbine to control the flow rate of the exhaust gas in the high speed state of the engine, and an overboost device for detecting the accelerating state of the engine and controlling the operation of the exhaust gas bypass device such that the exhaust gas bypass device reduces the flow rate of the exhaust gas introduced into the turbine only when the supercharging pressure has reached a predetermined pressure in the accelerating state of the engine.

10 Claims, 4 Drawing Figures

VARIABLE CAPACITY TURBOCHARGER CONTROL DEVICE

BACKGROUND OF THE INVENTION

1. Field of the Invention

The present invention relates in general to a device for controlling a variable geometry turbocharger by controlling the supercharging pressure through varying the exhaust gas volume in an automobile turbine according to the RPM and load on the engine, and more specifically, to a variable geometry tubocharger control device to provide an increase in torque and improvement in acceleration over the full range of engine operation, especially when accelerating.

2. Description of the Prior Art

In a conventional supercharging pressure control device for a variable geometry turbine, a movable member is provided which varies the channel surface area of an internal turbine housing which incorporates a scroll. The capacity of the turbine is varied by moving this member, thus providing control of the supercharging pressure over the entire operating range of the engine and improvement of the intake air combustion efficiency under acceleration.

However, in this type of conventional control device, with only a variable geometry mechanism which moves the movable member to provide a structure for controlling the supercharging pressure over the entire operating region, when the movable member is moved, the range in which the channel surface area of the scroll can be varied is limited. Control of the supercharging cannot be provided in a region which deviates from the range of movement of this variable geometry mechanism, that is, outside of the range in which the movable member moves, especially in the low and high velocity ranges. As a result, the efficiency of the turbine deteriorates, and this can create the drawback of causing the supercharging pressure to drop. In addition, because a stable supercharging pressure is not possible when accelerating from the low speed range to the high speed range, the difficulty of stimulation of an increase in torque over the entire operating range of the engine, and providing a satisfactory improvement in acceleration, become problems. Accordingly, there is an urgent requirement for a method of providing supercharging pressure control beyond the range of movement of the movable member, and increasing the supercharging pressure.

SUMMARY OF THE INVENTION

An object of the present invention is to provide a device for controlling a turbocharger which is capable of improving the torque characteristics over the entire operating range of an engine by increasing the supercharging pressure of the engine, and which is capable of providing improved acceleration from the low speed to the high speed range of the engine.

With the above object in view, the present invention resides in a device for controlling a turbocharger including a compressor and a turbine coupled to the compressor, said device comprising, variable capacity means for varying the flow rate of an exhaust gas introduced into the turbine in the flow speed state of an engine connected to the turbocharger, exhaust gas bypass means bypassing the variable capacity means and the turbine to control the flow rate of the exhaust gas in the high speed state of the engine, and overboost means for detecting tthe accelerating state of the engine and controlling the operation of the exhaust gas bypass means such that the exhaust gas bypass means reduces the flow rate of the exhaust gas introduced into the turbine only when the supercharging pressure has reached a predetermined pressure in the accelerating state of the engine.

BRIEF DESCRIPTION OF THE DEVICE

These and other objects, features, and advantages of the present invention will be more apparent from the following description of a preferred embodiment, taken in conjunction with the accompanying drawings, in which.

DESCRIPTION OF THE PREFERRED EMBODIMENT

An explanation follows covering one embodiment of the present invention with reference to FIGS. 1 to 4.

Figure 1:
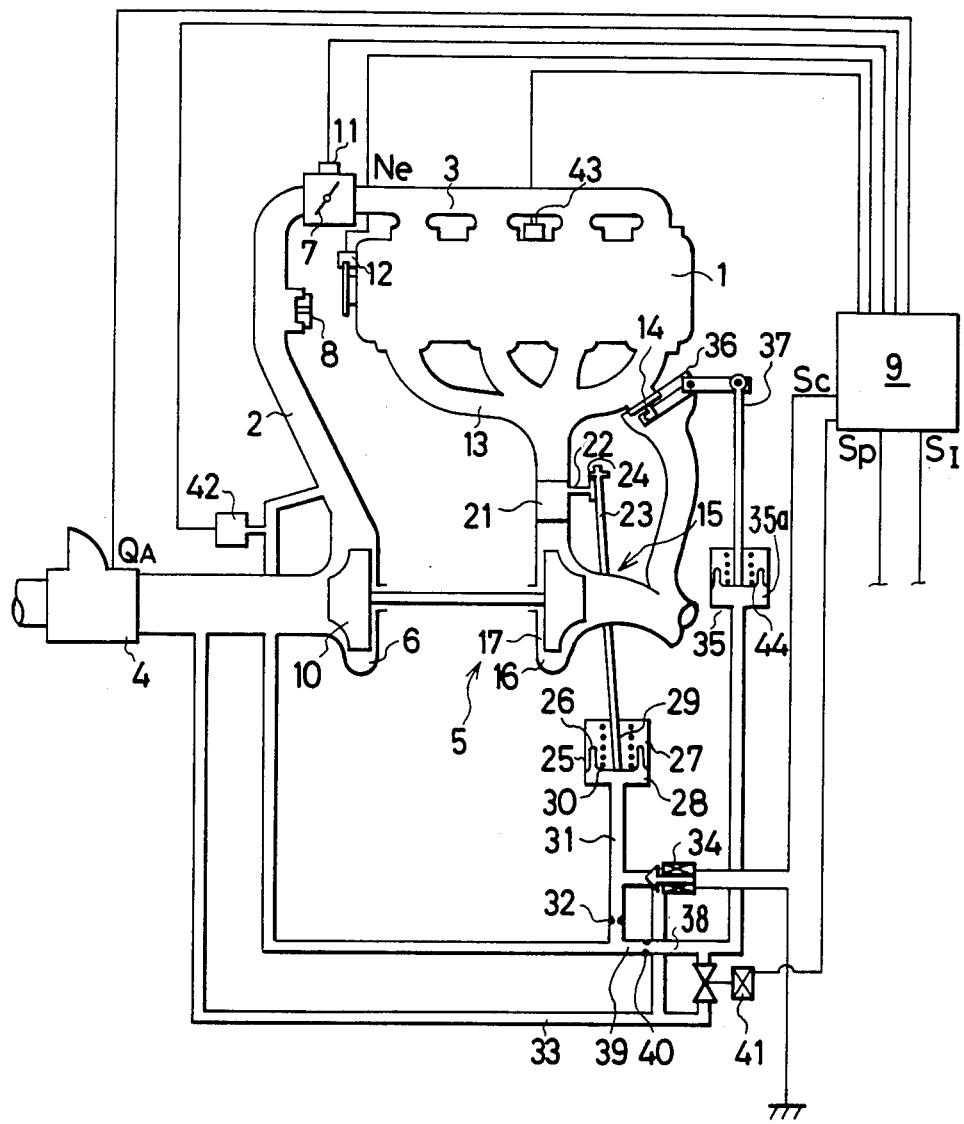
FIG. 1 is a general construction drawing of a variable geometry turbocharger control device embodying the present invention.
Figure 2:
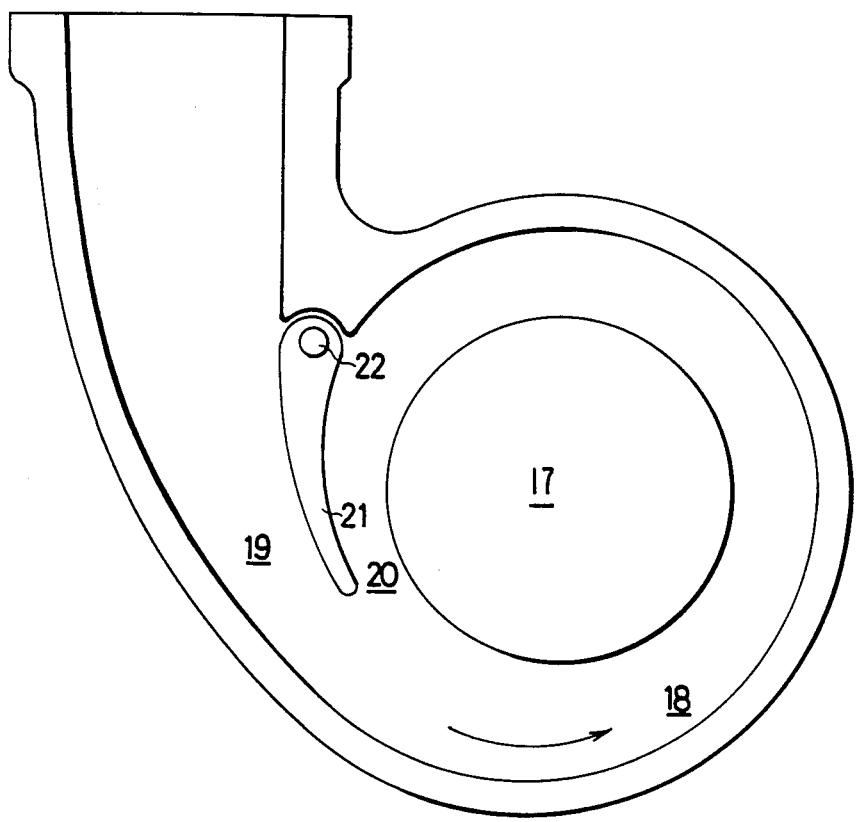
FIG. 2 is a sectional drawing of a capacity varying means in the device shown in FIG. 1.

As shown in FIG. 1, an air flowmeter 4, a compressor rotor casing 6 for a turbocharger 5, a throttling valve 7, and a relief valve 8 are provided in an intake air pipe 2 which is connected to an engine 1 through an intake air manifold 3. A capacity varying means 15 and a turbine rotor casing 16 for a turbocharger 5 are connected to an exhaust gas pipe which passes therethrough exhaust gas from an exhaust gas manifold 13. A turbine rotor 17 joined to a compressor rotor 10 is stored in the turbine rotor casing 16. The turbine roter casing 16, as shown in FIG. 2, is provided with a scroll 18 which is formed in such a manner as to enclose the turbine rotor 17. The surface area of the scroll 18 gradually becomes smaller in the downstream direction (in the direction of the arrows in the drawing) from an intake channel 19. A movable tongue member 21 is provided at the convergence of the intake channel 19 leading to the scroll 18 and an end section 20 of the scroll 18. The movable tongue member 21 constitutes a flap valve and is centered around a shaft 22 and swings or makes a pivotal movement in such a manner as to enlarge or reduce the inlet channel 19. The shaft 22 is connected to a rod 23, shown in FIG. 1, through an arm 24. The rod 23 is connected to a diaphragm 26 of a positive pressure actuator 25. The interior of a casing 27 of the positive pressure actuator 25 is divided into a positive pressure chamber 28 and an atmospheric pressure chamber 29 by the diaphragm 26. In the atmospheric pressure chamber 29, the diaphragm 26 is installed under compression exerted by a spring 30 in the atmospheric pressure chamber. In addition, an exhaust gas bypass valve 14 and a link mechanism 36, which converts the linear action of a rod 37 connected to a diaphragm 44 of a diaphragm actuator 35 to rotary motion, are provided in an exhaust gas channel. The construction of the diaphragm actuator 35 is similar to that of the positive pressure actuator 25. The chamber 35a of the actuator 35 communicates through a duct 38 having an orifice 40 with the intake air pipe 2 at the downstream of the compressor 10. The chamber 28 of the actuators 25 communicates through a duct 31 having orifices 32 with the intake air pipe 2 at the down upstream vicinity of the compressor 10. A normally-closed solenoid valve 41 is provided in a bypass duct 33, which is provided to communicate the duct 38 with the intake air pipe 2 at the upstream side of the compressor 10, and opens upon receiving a control signal from a control unit 9. The control unit 9 is a microcomputer comprising mainly a microprocessor, a memory, and an interface.

The output signals from an air flowmeter 4, a pressure switch 42, a throttle position sensor 11, a crank angle sensor 12 and a knock sensor 43 are input to the interface of the control unit 9.

The pressure switch 42, which detects the supercharging pressure, is installed between the upstream side of the positive pressure channel 31 and the downstream side of the compressor rotor casing 6.

In addition, the solenoid valve 34 is connected to the positive pressure channel 31, which is positioned between the actuator 25 and the fixed orifice 32. The solenoid valve 34 carries out the opening and closing action in accordance with a duty value of the control signal from the control unit 9.

An overboost mechanism in the present invention has the pressure switch 42 and the exhaust gas bypass device including the bypass valve 14, the link mechanism 36, the rod 37 and the diaphragm actuator 35. The overboost mechanism also has the control unit 9 including a device for judging the accelerating and knocking states of the engine as described later.

The action of the embodiment of the present invention, constructed as outlined above, will now be explained.

A signal from a throttle position sensor 11, conforming to the RPM and load of an automobile engine, is input to the control unit 9, and from this signal the acceleration is determined within the control unit 9, and the action to be taken with respect to the capacity varying mechanism 21 and exhaust gas bypass valve 14 at a steady state and in an accelerating state are decided.

Under steady state condition, the solenoid valve 34, which is duty controlled (actuating signal thereof has a controlled duty cycle) by the control unit 9, receives a control signal from the control unit 9, corresponding to the duty value. When the duty value is, for example, 0%, an closing action of the valve 34 is carried out, and from this closing action, the positive pressure in the positive pressure channel 31 is increased. The positive pressure is then applied to the positive pressure chamber 28 of the positive pressure actuator 25. As this positive pressure increases, the diaphragm 26 moves to the atmospheric pressure chamber 29 side. Through the movement of the diaphragm 26, the rod 23, the arm 24, and the shaft 22 are activated, and the movable tongue member 21 swings in a manner so as to enlarge the exhaust gas intake channel 19. Accordingly, the movable tongue member 21 causes the magnitude of the surface area of the intake channel of the exhaust gas acting on the turbine rotor 17 to change. It is used, therefore, on the whole as a capacity varying mechanism. That is, in this capacity varying mechanism, when the control signal transmitted to the solenoid valve 34 from the control unit 9, is changed, by the action of the solenoid valve 34 which carries out duty control, the positive pressure actuator 25 is activated so as to move the rod 23 in the upward direction in FIG. 1, and the exhaust gas flow exhausted from the exhaust gas manifold 13 is increased. As a result, the torque characteristics in the low speed range are improved. In this low speed state of the engine, the exhaust gas bypass valve 14 is closed.

Figure 3:
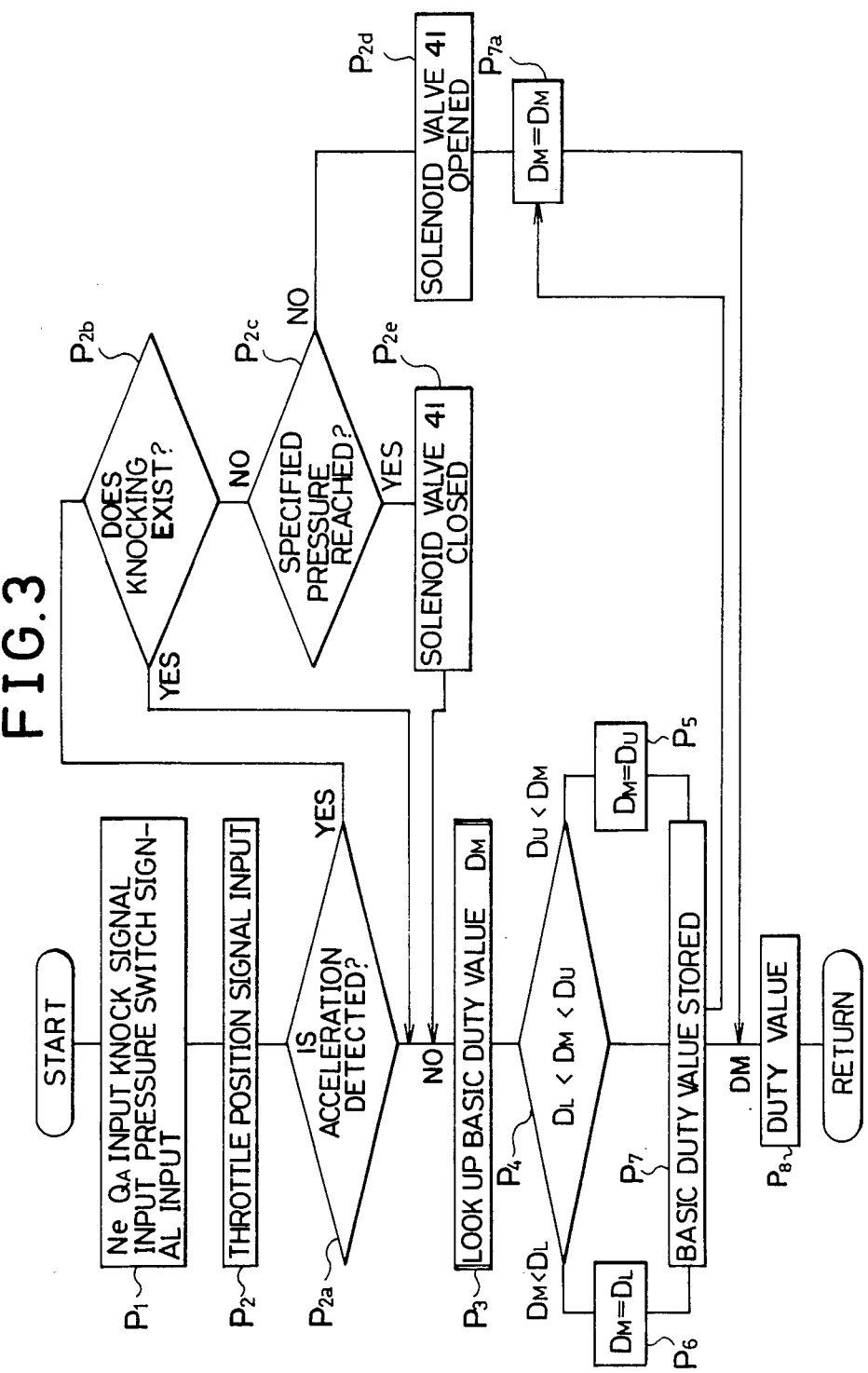
FIG. 3 is a flowchart showing the control program for the device shown in FIG. 1.

When an accelerating state is detected by the signal input to the control unit 9 from the throttle position sensor 11, the operational flow in the control unit 9 is varied. By means of this flow change, according to a knock signal of the knock sensor 43 input to the control unit 9, a determination of a knocking is made in the control unit 9. If the knocking condition is found, the operation within the control unit 9 is changed to steady state. However, if the knocking condition is not found, the control unit 9, through the pressure switch signal input from the pressure switch 42, determines whether the supercharging pressure has or has not reached a predetermined value. The control from the control unit is then changed to conform to the various circumstances. That is, as shown in FIG. 3, when it is determined that the supercharging pressure has not reached the predetermined pressure valve, the normally-closed solenoid valve 41 is activated to open by a control signal from the control unit 9. Therefore the bypass inlet duct 33 is opened so that the control pressure transmitted from the diaphragm actuator 35 is lowered. The exhaust gas bypass valve remains fixed in the closed position. At that time, the control signal to the solenoid valve 34 is not activated, and the degree of opening of the movable tongue member 21 is constantly maintained. On the other hand, when the supercharging pressure has reached the predetermined pressure value, the control signal from the control unit 9 causes the normally-closed solenoid valve 41 to change to the steady state. The valve 41 is then closed by the control unit 9, and the rod 37 of the actuator 35 is moved in the upward direction, thus opening the bypass valve 14 through the link mechanism 36. Then, the control pressure applied by the diaphragm actuator 35 increases, and the exhaust gas bypass valve 14 is released from the closed status. Accordingly, the acceleration state is determined through the acceleration determining means provided in the overburst mechanism. Furthermore in addition to eliminating knocking, when it is determined through the pressure switch 42, that a fixed supercharging pressure has not been achieved, the exhaust gas bypass valve 14 of the bypass mechanism is not actuated. The control means provided in the overboost mechanism is used to promote the increase of a supercharging pressure, making it possible to improve the torque characteristics in the high speed range, and improve acceleration.

Next, based on the flowchart shown in FIG. 3, the use of the duty control will be explained. Further, each step on the flowchart is shown by P1 to P8.

First, in step P1, A/D converted signals for the engine RPM, Ne, and an intake air flow volume Qa, a knock signal and a pressure switch signal are input to the control unit 9. In step P2, the throttle position signal is input to the control unit 9. In step P2a, the acceleration state is determined by means of the throttle position signal. If a steady state is determined, a basic duty value $D_M$ is looked up in step P3 in accordance with the intake air flow $T_P$ and the engine rotational speed Ne.

After this step, the operation moves to step P4, where in consideration of the action delay time of the solenoid valve 34 and to prevent incorrect action in the calculation section, a determination is carried out to find whether the basic duty value Dm, which was looked up in step P3, is between a upper limit value Du and lower limit value D1. That is, when Dm becomes larger than D1, Dm is fixed at the upper limit in step P5, while when Dm becomes smaller than D1, Dm is fixed at the lower limit value DL in step P6. In addition, when Dm falls between D1 and Du, the value of Dm is used without change.

Next, in step P7, the basic duty value Dm which was looked up in step P3 is recorded in memory, and further, at step P8, the basic duty value is used in the calculation of the duty control value. Based on the result of this calculation, the opening or closing action of the solenoid valve 34 is determined by the output signal which is output from the control unit 9.

In addition, if the acceleration state is found in step P2a, the operation goes to step P2b, where the knock determination is carried out in accordance with a signal from the knock sensor 43. When knocking occurs, the flow control changed from an acceleration state to a steady state. If the result of the above decision in step P2b is NO (i.e. no knocking condition exists), a decision is made in step P2c whether the supercharging pressure has reached the specified or predetermined pressure value or not in accordance with a signal from the sensor 42. When a predetermined pressure has been reached, the solenoid valve 41 remains closed, and the flow control is changed (step P2e) steady state. On the other hand, when the predetermined pressure has not been reached, the normally closed solenoid valve 41 is opened (step P2d) by the control signal from the control unit 9. At this time, the duty control value of the solenoid valve 34 is the same as the value determined the acceleration state, so that the basic duty value Dm which has been stored in memory is used without change, and the duty value calculations for the solenoid valve 34 are carried out. This result is output through the interface (step P8) of the control unit 9. The program then returns to repeat steps P1 to P8.

Figure 4:
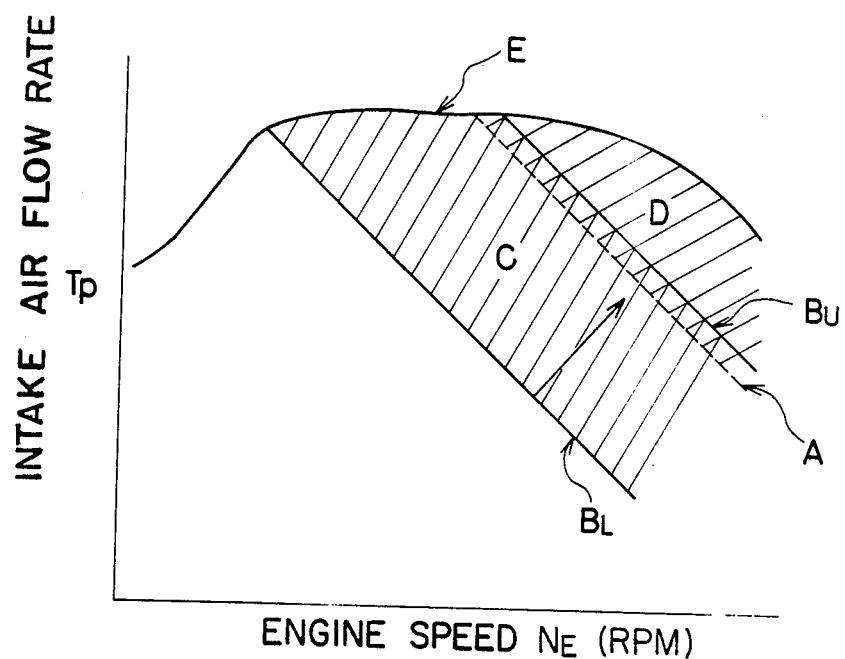
FIG. 4 is a drawing which explains a control table relating the torque and the engine RPM.

Referring to FIG. 4 there is shown the characteristics of the look-up table used in this embodiment of the invention. The horizontal axis shows the engine RPM (Ne), while the vertical axis gives air flow rate $T_p$ for each revolution of the engine. The line E shows the operating state with the throttle valve 7 fully closed. The point B1 represents the predetermined value of the supercharging pressure (375 mm Hg) with the movable tongue member 21 fully closed. The point Bu is the predetermined value of the supercharging pressure with the movable tongue member 21 fully opened. The region C between these points indicates the change in the position of the movable tongue member 21. The direction of the arrows indicates an increase in the opening of the tongue member 21. In the present invention, the positive pressure activator 25 is adjusted to be actuated at a pressure slightly higher than the predetermined supercharging pressure, so that when the normally closed solenoid valve 41 is closed, the operation of the actuator 25 is in the region D. That is, the actuator is operated in the region D from the operating line A to the line E where the throttle valve 7 is fully closed.

As outlined in the above explanation, in the present invention, by the provision of the capacity varying mechanism, the exhaust gas bypass mechanism, and overboost mechanism, a supercharging pressure is controlled to increase the number of rotations of the turbine by the capacity varying mechanism in the low speed range of the engine and by the bypass mechanism in the high speed range of the engine. The overboost mechanism controls the bypass mechanism to reduce the exhaust gas flow introduced into the turbine only when the supercharging pressure has reached a predetermined pressure in the accelerating state of the engine. Therefore, a high supercharging pressure is obtained from a low speed load zone of the engine to a high speed load zone of the engine so that the torque characteristics over the entire operating range of the engine can be improved. In addition, by means of the overburst mechanism, acceleration can be considerably improved over conventional performance.

It is intended, therefore, that all matter contained in the foregoing description and in the drawings shall be interpreted as illustrative only, and not as limitative of the invention.

What is claimed is:

1. A device for controlling a turbocharger having a compressor and a turbine coupled to the compressor, said device comprising:

means for determining the supercharge pressure of air from said compressor;

variable capacity means for varying the flow rate of exhaust gas introduced into the turbine in a low speed state of an engine connected to the turbocharger, said variable capacity means responsive to a first control signal;

exhaust gas bypass means for controlling the flow rate of the exhaust gas bypassing said variable capacity means and said turbine in a high speed state of the engine, said bypass means responsive to a second control signal;

a control means, responsive to operating parameters of said engine, for generating said first and second control signals; and said control means including means for detecting an acceleration state of the engine and responsive to said determined supercharge pressure and generating said second control signal for controlling the operation of the exhaust gas bypass means such that the exhaust gas bypass means reduces the flow rate of the exhaust gas introduced into the turbine only when the determined supercharge pressure has reached a predetermined pressure in an acceleration state of the engine.

2. A device for controlling a turbocharger as claimed in claim 1, wherein said variable capacity means has a flap valve for varying the exhaust gas flow to said turbine, said flap valve disposed in an inlet portion of the turbine.

3. A device for controlling a turbocharger as claimed in claim 2, wherein said flap valve has a movable tongue member pivotally disposed in the inlet portion of the turbine to vary the exhaust gas flow introduced into the turbine.

4. A device for controlling a turbocharger as claimed in claim 2, wherein said variable capacity means has a positive pressure actuator for actuating the flap valve through a first rod connected to the flap valve, said actuator having therein an atmospheric pressure chamber, a positive pressure chamber, a diaphragm disposed between said chambers and connected to the first rod, and a spring for biasing the diaphragm to move the first rod.

5. A device for controlling a turbocharger as claimed in claim 1, wherein said exhaust gas bypass means includes a bypass valve, for discharging the exhaust gas flow, disposed in an outlet portion of the engine.

6. A device for controlling a turbocharger as claimed in claim 5, wherein said exhaust gas bypass means includes a diaphragm actuator for actuating the bypass valve and a link mechanism connected to the bypass valve and the diaphragm actuator.

7. A device for controlling a turbocharger as claimed in claim 1, wherein said control means further includes knock detecting means for detecting whether the engine is knocking, said control means controlling the operation of the exhaust gas bypass means such that the exhaust gas bypass means reduces the flow rate of the exhaust gas introduced into the turbine only when the supercharge pressure has reached the said predetermined pressure in the acceleration no-knocking state of the engine.

8. A device for controlling a turbocharger as claimed in claim 7, wherein the exhaust gas bypass means has a bypass valve for discharging the exhaust gas flow disposed in an outlet portion of the engine, a diaphragm actuator for actuating the bypass valve, and a normally-closed solenoid valve electrically connected to the control means to control the actuation of the diaphragm actuator, said normally-closed solenoid valve being closed or opened depending upon whether the supercharging pressure has respectively reached said predetermined pressure or not in the acceleration state of the engine, thereby respectively opening or closing the bypass valve through the actuation of the diaphragm actuator.

9. A method of controlling a turbocharger of an engine, said turbocharger having a turbine and a compressor, and said method comprising the steps of:
  (a) detecting a supercharge pressure of air from said compressor;
  (b) varying the exhaust flow rate of exhaust gas introduced into said turbine from an exhaust of said engine during a low speed state of the engine;
  (c) bypassing exhaust gas from the exhaust of said engine around the turbine in a high speed state of the engine;
  (d) detecting an acceleration state of the engine; and
  (e) increasing the amount of air bypassing said turbine in a high speed acceleration state of the engine when the supercharge pressure reaches a predetermined value.

10. A method as recited in claim 9 further comprising the step of detecting a non-knocking state of the engine and wherein said increasing step (e) increases the amount of air bypassing said turbine only when said engine is in a non-knocking state.

* * * * *